Dec. 20, 1966 M. NEWMAN 3,292,610
ANIMATED DOLL OR DISPLAY DEVICE
Filed Feb. 8, 1963 3 Sheets-Sheet 1
FIG.1
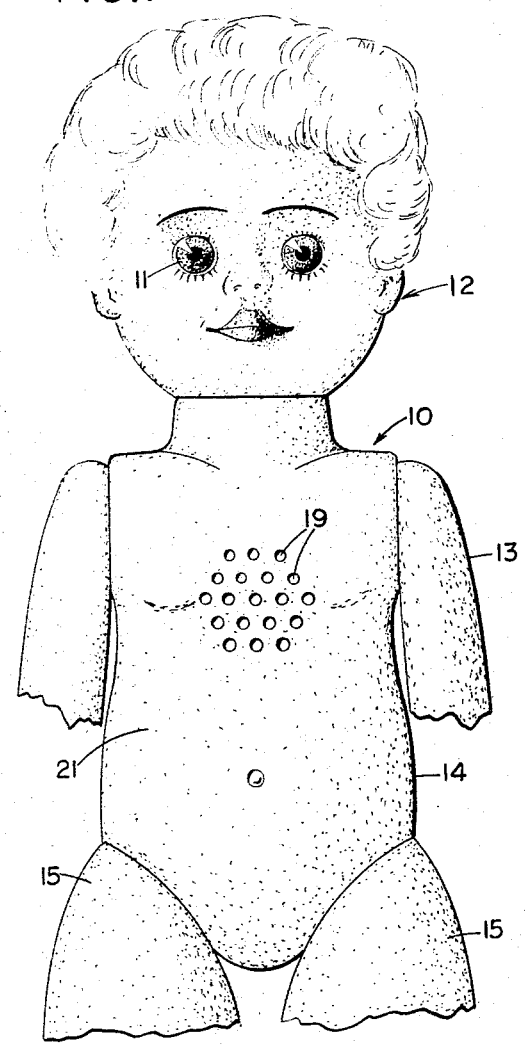
FIG.2
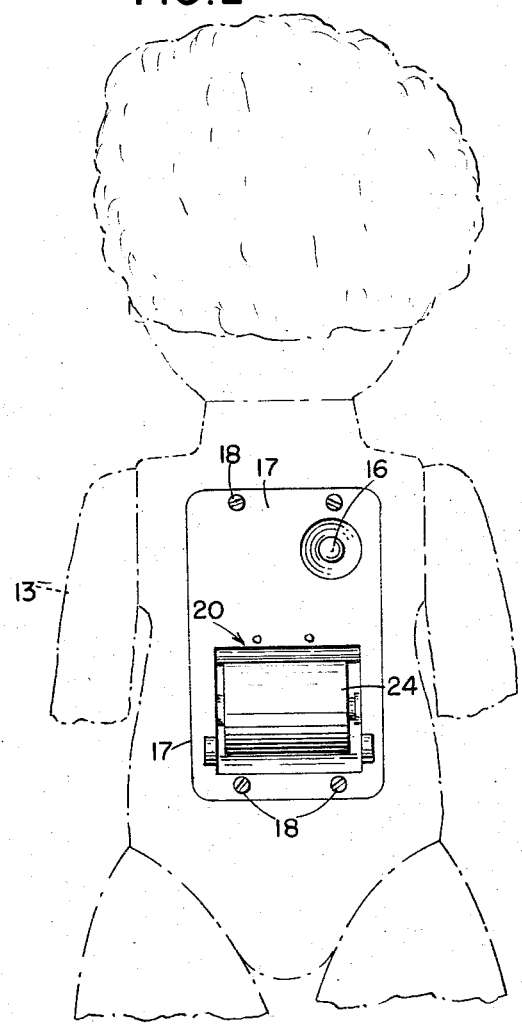
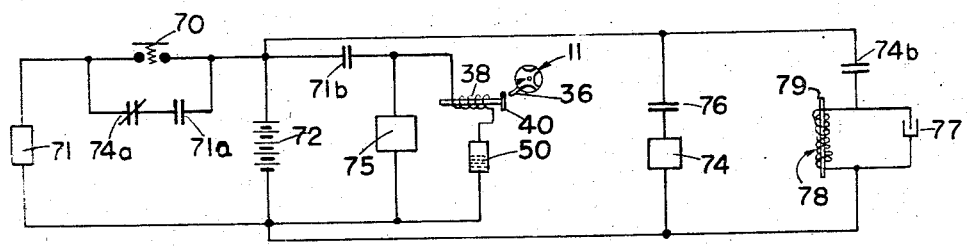
FIG.18
INVENTOR.
MICHAEL NEWMAN
BY Mc.Glew & Toren
ATTORNEYS.

Dec. 20, 1966   M. NEWMAN   3,292,610
ANIMATED DOLL OR DISPLAY DEVICE
Filed Feb. 8, 1963   3 Sheets-Sheet 2
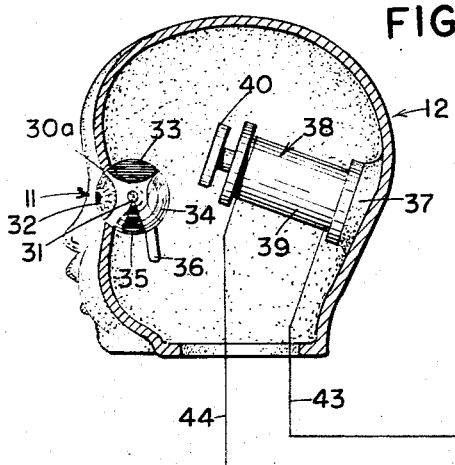
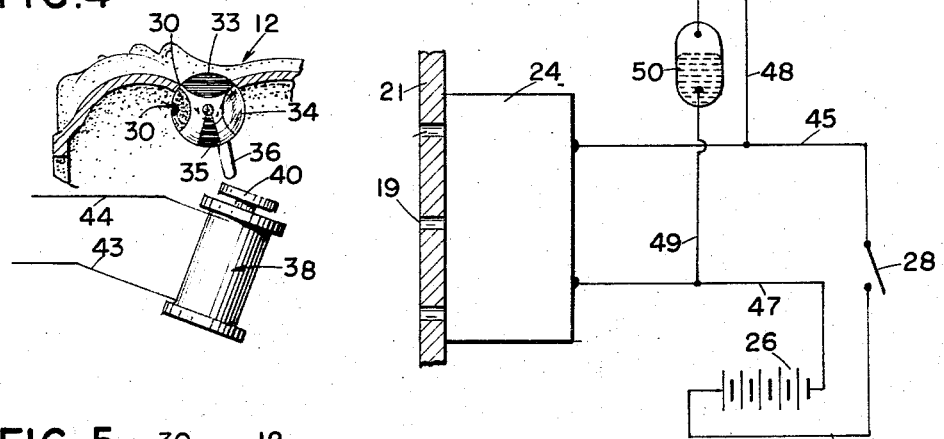
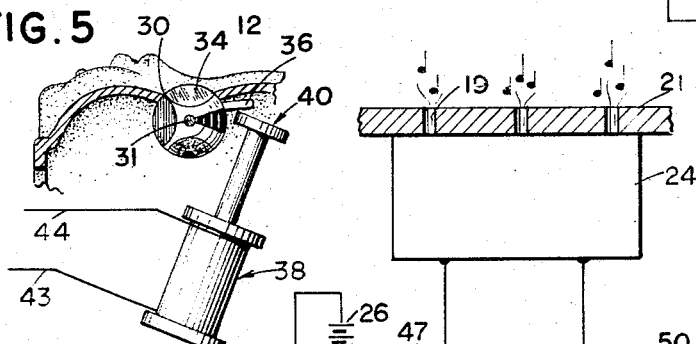
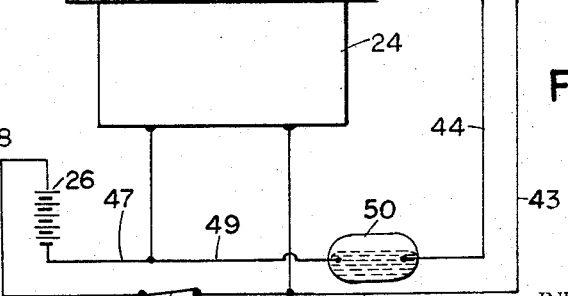
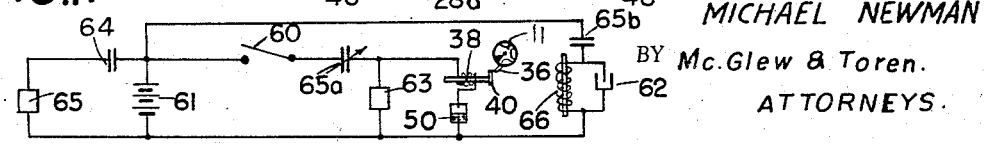
INVENTOR.
MICHAEL NEWMAN
BY McGlew & Toren.
ATTORNEYS.

Dec. 20, 1966    M. NEWMAN    3,292,610
ANIMATED DOLL OR DISPLAY DEVICE
Filed Feb. 8, 1963    3 Sheets-Sheet 3
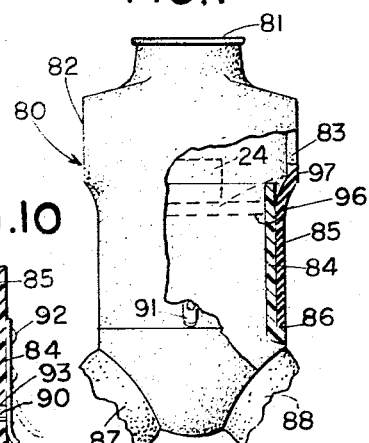
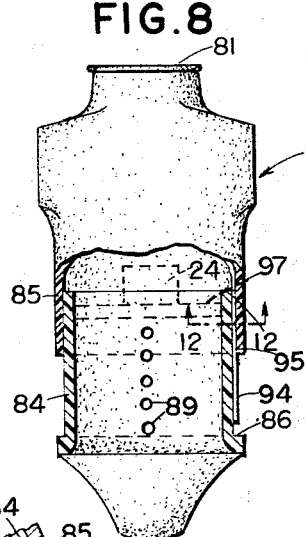
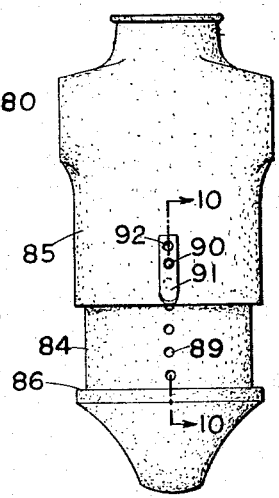
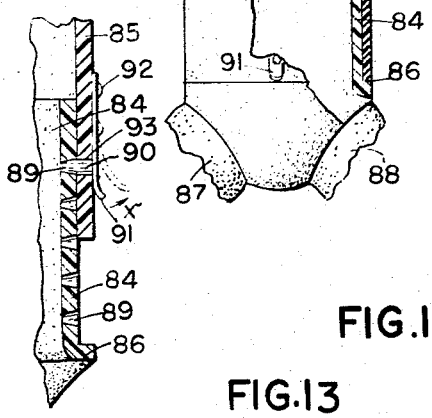
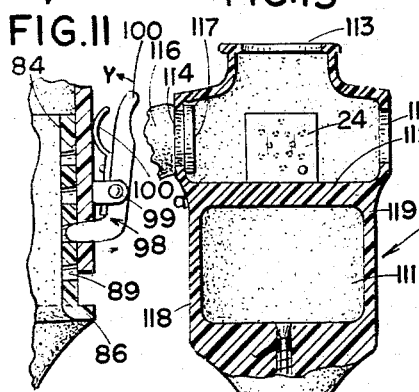
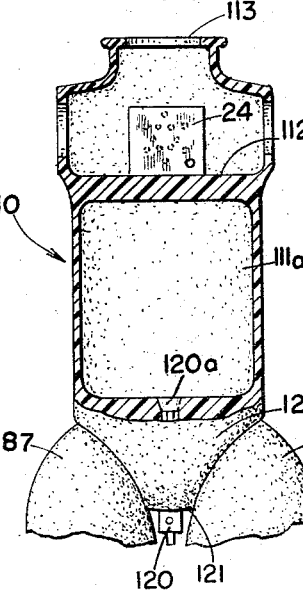
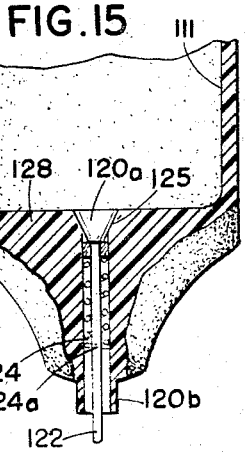
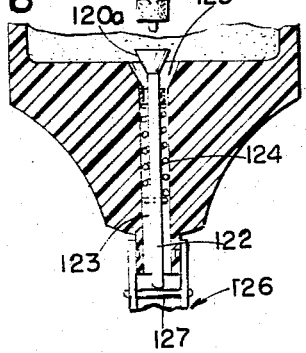
INVENTOR.
MICHAEL NEWMAN
BY Mc.Glew & Toren
ATTORNEYS.

United States Patent Office 3,292,610
Patented Dec. 20, 1966

3,292,610
ANIMATED DOLL OR DISPLAY DEVICE
Michael Newman, 514–16 W. 147th St.,
New York, N.Y. 10031
Filed Feb. 8, 1963, Ser. No. 257,183
6 Claims. (Cl. 128—1)

This invention relates generally to display and like structures and more specifically to dolls and similar toy articles used as supports for sound or voice recording and/or reproducing equipment and the like and for carrying out various mechanical functions and movements with reference to the voices.

It is well known in the art to install in doll structures voice reproducing devices, and it is also conventional to construct doll's members, so that they perform movements. It is known to move doll's eyes to sleep simulating position by placing the doll's head in a position different from an upright position.

The present invention aims at using the doll itself as a medium in psychologically aiding a child to doze off and finally to fall asleep without the assistance or presence of a person and convey to the child sleep suggestive sentences, lullabys and similar external sleep inducing means, while the doll is located next to the child.

It is another object of the invention to provide means releasing in a doll's body a transducer device which, for example, is capable of recording and/or reproducing voices and sounds and further, in response to the same, of controlling the eyes of the doll, so that the child or baby, while listening to the doll's voice, will observe the doll's eyes, which in predetermined position at least partly will reflect the image of the child's face, thereby to urge and induce the child to fall likewise asleep while perceiving and watching such happenings.

Another object of the invention is to provide means facilitating resetting the initial position of the doll's eyes' reflecting portion upon termination of the action of voice-reproducing means, which, in turn, are also retracted to starting position.

A further object of the invention is to provide means changing the length or other dimensions of a doll's body and to adjust the latter with the changing timbre or quality of the doll's voice emanating from an interchangeable or adjustable voice reproducing device.

Yet another object of the invention is to provide means affording convenient accommodation of accessories, relays, switches and like elements within the doll's body parts and simultaneously employing the same to reinforce the doll's extensible structural parts.

Another object of the present invention resides in the provision of means conducive to premeasured dimensional changes of the doll's torso either in lengthwise direction of the latter and/or in another desirable direction to simulate growth of the article or doll.

Still a further object of the invention is to provide means facilitating the assembly of the doll's body in a very convenient and simplified manner, resulting in a sturdy and durable toy device, which may preferably be made of plastic or plastic composition which is generally unbreakable and may be subjected to rough handling by the child without damaging the doll and the built-in parts.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial front elevational view of a doll embodying features of the invention;

FIG. 2 is a rear elevational view of the doll of FIG. 1 showing the mounting of a sound mechanism and release button therefor as mounted in the doll's body;

FIG. 3 shows, on an enlarged scale and in section, the doll's head in upright position having incorporated a simplified wiring diagram for the actuation of the sound mechanism and of the eye-operating device;

FIG. 4 shows, in section, a part of the head of the doll of FIG. 3 in horizontal position and with the eye-operating device in a preliminary position;

FIG. 5 shows, in section, a view similar to that of FIG. 4 with the eye-operating device in an end position;

FIG. 6 illustrates diagrammatically the wiring diagram of FIG. 3, when the doll's head has been changed to a position indicated in FIG. 5;

FIG. 7 shows the torso of a doll with parts broken away and in section indicating telescopic structural parts of the doll's body;

FIGS. 8 and 9 show different positions of the parts of the doll's torso of FIG. 7;

FIGS. 10 and 11 indicate two different release mechanisms, shown in section and employable in connection with the torso structure of FIGS. 7 to 9;

FIG. 12 is a fragmentary and enlarged sectional view of the doll's body, the section being taken along line 12—12 of FIG. 8;

FIGS. 13 and 14 indicate two different positions of a doll's torso in modified form, seen in section and equipped with a valve mechanism;

FIGS. 15 and 16 illustrate on an enlarged scale and in section two different positions of the valve mechanism, indicated in FIGS. 13 and 14; and FIGS. 17 and 18 illustrate two different wiring diagrams employable in connection with the doll and for the purpose of the invention.

Referring now more specifically to the drawings, there has been disclosed a doll's body 10 having as main parts a movable head 12 with rotatable eyes 11, arms 13 (partly shown), torso 14 and legs 15 (broken away). The doll 10 is equipped in this instance with a transducer in the form of a sound reproducing apparatus 20 (or, if desired, a combination of sound recording and sound reproducing appliance) of known structure provided with a push button or release mechanism 16 which may be mounted on a frame 17 which, in turn, is fixed in a position as at 18 to interchangeably extend into the doll's body. Any suitable and known plastic or plastic composition or metal may be employed as material for the doll and like carrier.

In the front 21 of the torso of the doll's body 10 there are provided openings 19 which extend toward a sound box, loudspeaker or like diaphragm carrying known sound instrument 24 forming a component part of the aforesaid apparatus 20.

In head 12 of the doll there are accommodated eyeballs 11 (for the sake of clarity one eyeball only being shown). Each eyeball 11 is pivotally supported on a spindle 31 and includes a pupil part of section 32, an eyeball blank part 33, a shiny and highly reflecting area 34, a counterweight section 35 and an extension or finger 36 for a purpose about to be described. Further arranged in the hollow head 12 is an electrically operated solenoid or like switching device 38 supported on a base 37 and equipped with a core-supported pusher 40 which is adapted to be moved in and out of the solenoid spool 39 for a purpose later referred to.

When the doll's head 12 is placed in a horizontal position (FIGS. 4 and 5), each eyeball (or one of the eyeballs) 11 of the doll is automatically rotated about its pivot pin 31 to assume a position in which the eyeball part 33 appears and is exposed in opening 30, as clearly seen in FIG. 4. In such case, the displaced counterweight 35 maintains part 33 in the desired location with respect to eye opening 30 to indicate that the doll is asleep.

If thereafter the solenoid 38 is included in a battery-operated circuit 43, 44, pusher 40 connected with the solenoid core will be moved out of the solenoid spool now under current, and will cause rotation of the eyeball 11 about pivot 31 till the highly polished or chrome-plated eyeball section 34 appears in eye opening 30. This movement of the eyeball may be carried out in any desired positive way, e.g. by the coaction of pusher 40 and actuating finger 36 which extends from the eyeball into the path of the solenoid-operated pusher 40.

It is well understood that as soon as solenoid 38 is shut off from the current source or battery 26, eyeball 11 returns automatically to its former position at 33 and 32, successively, due to the effect of the counterweight 35, when the doll assumes its upright position of FIG. 3.

For the purpose of demonstrating the function of the doll 10, reference is made to the electric wiring diagram seen in FIG. 3, which in a simplified manner includes battery 26, hand-operated (preferably a known time-delay push button) switch 28, and a power-driven sound reproduction device 24 with which a loudspeaker or sound box cooperates, so that sound may be perceived through perforations 19. Switch 28 is further operatively connected in a conventional manner with the needle-carrying sound box 24, so that for a predetermined time interval upon closing push button switch 28 a sound reproduction circuit is closed passing from battery 26 via lines 46, 47, closed switch 28, line 45 to the terminals of sound device 24. As long as the doll's head 12 is in the upright position, no current will be supplied to solenoid 38. Only after the doll's head is placed in a horizontal or "sleeping" position, circuit 48, 49, 43, 44 will be connected to the circuit 45, 47 via a mercury switch 50, as may be realized from FIG. 6. In this location of head 12, switch 28 assumes the closing position 28a, so that the shiny eyeball piece or section 34 is moved to appear in eye opening 30, while a lullaby or other desirable sound will be perceived through openings 19 in a selected part of the body. As soon as switch 28 is interrupted in its closed position 28a, current to solenoid 38 will cease and the eyeball section 33 appears again in eye opening 30, before the doll's head 12 assumes its normal upright position (FIG. 3) to expose in said opening 30 the eye 11 with pupil part 32.

FIGS. 17 and 18 illustrate two different control circuits for carrying out the aforesaid doll's functions.

The circuit of FIG. 17 contains a push button interval time switch 60 of known construction (which corresponds to switch 28), a battery 61 and a normally closed micro-relay contact 65a for operating the record player or sound reproducing device 63, which, in predetermined operated position, operates and closes normally open limit switch 64 and thus places relay 65 into the aforesaid circuit. As a consequence thereof, normally closed contact 65a is opened and normally open contact 65b will be closed to bring about, via a circuit containing condenser 62, resetting action for the record player 63 by means of actuation of solenoid 66, which momentarily operates a known resetting mechanism (not shown) for sound reproducing device 63 which corresponds to device 24. While switch 60 is closed, movement of the doll may be had to automatically switch into the circuit, via mercury switch 50, solenoid 38 and further eyeball actuating means 40 which moves into the path of finger 36 in a manner as before described.

FIG. 18 shows a wiring diagram, in which a momentary push button 70 (which may correspond to switch 28), is actuated, to close a circuit in which relay 71 with its normally open contacts 71a, 71b are placed. As soon as battery 72 is enabled to feed current to relay 71, its contacts 71a and 71b will be closed and a holding circuit will be established via normally closed contact 74a of relay 74, so that record player 75 may be activated.

As soon as the arm of record player 75 actuates and closes limit switch 76, relay 74 will be included in the circuit, so that contact 74b will be momentarily closed. Condenser 77 is thus charged sufficiently to permit, upon subsequent opening of limit switch 76, that contact 74b will be again opened, so that condenser 77 discharges through solenoid 78 and effectuates, through movement of pusher 79, the actuation of a known resetting mechanism (not shown), thus bringing the record player 75 back to its initial playing or recording position, as the case may be.

As soon as record player 75 is included in the aforesaid circuit, then through movement of mercury switch 50 into its contact-making or tilted position (as indicated in FIG. 6), solenoid 38 will be able to cause pusher 40 to rotate eyeball 11 by means of extension or actuator 36 to a position exposing highly polished eye section or part 34, as heretofore explained.

Reference is now made to FIGS. 7 to 14 illustrating two different embodiments of the invention incorporating the feature of a more grown up doll's body according to which the voice reproducing apparatus heretofore described (not shown here) has been replaced by another or similar apparatus reproducing a voice of different timbre, sound or quality, so that the doll's body can be adjusted in dimension to a grown-up baby able to talk or even converse.

FIGS. 7 to 9 illustrate stages of the growth of the torso of a doll's body 80 having the neck portion 81, side openings 82, 83 for the arms and an elongated first tubular outer part 85, which frictionally engages a similar shaped second tubular inner part 84 provided with a stop or abutment ledge 86 for part 85. Part 84 carries the legs 87, 88 (only partly illustrated) and is further provided with recesses or conically shaped openings 89 (FIG. 10) adapted to coact with a conical pin 90 which projects from a springy adjustment lever 91, which is affixed at 92 to the outer wall of part 85. Pin 90 is further guided in perforation 93 of part 85 and snaps into one of the openings 89 after lever 91 has been first lifted in the direction of arrow X to dotted line position. Pin 90 becomes thus first disengaged from one opening 89 and may then be inserted into another opening chosen from a row of openings to adjust parts 84, 85 relative to each other to simulate growth of the doll's body, as is well understood (FIGS. 8 to 10).

In order to avoid rotational movement of the telescopically engaged parts 84, 85, interengageable means, such as rib and groove 94, 95 are provided which ensure guided lengthwise relative displacement of parts 84, 85 during adjusting operation.

Near the upper end of inner hollow part 84 and as indicated at 96, a transverse partition or bearing plate 97 may be arranged on which instrumentalities (not shown) pertaining to the transducer or like apparatus may be mounted. This bearing plate 97 also contributes to reinforcing of the lengthy hollow inner part 84.

FIG. 11 illustrates a fragmentary sectional view of a modified adjustment element 98 which is spring-supported and pivoted at 99 and actuated by means of a grip 100 movable against the tension of the spring 100a in the direction of arrow Y for the purpose of adjustment of body parts 84, 85 relative to each other, as is well understood. Otherwise function and result of the lengthwise adjusted parts remain the same, as explained with respect to FIGS. 8 to 10.

FIGS. 13 to 15 indicate a further modified form for adjusting the length or other dimensions of the torso of a doll's body 110 which, in this instance, is made from metal or expansible or extensible material such as rubber, flexible plastic or plastic composiiton. Torso of body 110 is compartmentalized, as shown, having the lower extensible chamber 111 with an upper rigid and heavy partition 112 on which the transducer apparatus 24 or relays, etc. may be disposed and for withdrawal therefrom through neck opening 113, in which the doll's head (not shown) may be movably mounted in any appropriate manner known in the art. In arm openings 114, 115 may be frictionally inserted compressible arms 116 (only one being partially indicated in opening 114) which terminate each in a disc-shaped abutment 117 or like holder.

Chamber 111 has side walls 118, 119 of predetermined thickness adapted to be extended in lengthwise direction thereof, as seen in FIG. 14 to obtain an extended and elongated chamber 111a. To this end there has been provided a valve arrangement 120 near the crotch 121 of the doll's body, whence a tube 120b leads into chamber 111. Valve arrangement 120 consists of a valve body 120a proper which is carried and guided by means of a stem 122 within bore 123. Within bore 123 of tube 120b there is retained on a seat a coil spring 124 operatively connected at 124a to valve stem 122 to normally retract valve body 120a onto its seat 125 (FIG. 15), and to close chamber 111. This chamber may be supported laterally in any appropriate manner (not shown), if desired, to avoid undesirable tilting of the upper torso portion, in particular if chamber 111 has been extensively filled with air by means of an air pump 126 (partially indicated) or any compressed air holding receptacle.

Upon application of pressure through abutment 127 against the free end of stem 122, the latter will be lifted and air under pressure will be introduced through tube 120b past open valve 120a until the end of stem 122 is released, so that spring 124 effectively forces stem 122 together with valve body 120a to its closing position on seat 125 (FIG. 15).

Instead of inserting valve structure 120 into the lower and reinforced body portion at 128, as shown, other valve and closure constructions may be used and applied, e.g., to the upper reinforced partition 112 where the valve may be completely hidden from view. In order to cause measured escape of air from the lengthwise stretched doll's interior or chamber 111a, all that has to be done is to momentarily press against the end of stem at 122.

Furthermore, chamber 111 may be internally fixed with a plurality of integral longitudinal stiffening ribs or other suitable means (not shown) to counteract, if desired, any sideward swinging movement of the lengthened body of the doll 110.

It is to be understood that the invention is applicable not only to dolls and similar toy articles, but also to display and similar appliances, whereby display parts are to be exhibited, which may have reference to explanations or sentences reproduced by the voice reproducing means. The voice reproducing device simulating a crying baby will operate a relatively smaller doll's body than a device simulating lullabys, entire sentences, etc., so that the same doll's body may be adjusted thereto in dimension (length, etc.) and in size, as herein set forth.

It can thus be seen that there has been provided, pursuant to the invention a display, toy and like actuatable device comprising electric circuit means including a plurality of instrumentalities, a body supporting said instrumentalities, said instrumentalities including a pivotally supported member having an extension and provided with a plurality of sectional display parts, gravitational means connected with said member, whereby the latter is rotated automatically to exhibit one of said display parts upon placing said body in a predetermined position, electromagnetic means provided with a core carrying a pusher, which is arranged in the path of movement of said extension, sound reproducing means, a mercury switch, and a hand-operated electric switch, said sound reproducing means being connectable with said circuit means through said electric switch in any desired position of said body to thereby change electrical to acoustical energy, said member being adapted in said predetermined body position and when said electromagnetic means is connected with said circuit means through said mercury switch to be further rotated upon engagement of said pusher with said extension, so that the latter displaces said member for displaying a sectional display part of said member, which differs from the display part automatically exhibited through action of said gravitational means.

While specific embodiments of the invention have been shown and described in detail to illustrate the application of the inventive principles, it will be understood that the invention may be embodied otherwise without departing from such principles.

What is claimed is:

1. A doll comprising, in combination, a hollow body provided with an opening, transducer means mounted in said body, electromagnetic means provided with a core carrying a pusher, mechanically operable means arranged for rotational movement below said opening in said body and provided with surface sections for exposure thereof below said opening of said body, electric circuit means, including a hand-operated switch, position sensitive electric switch means, said transducer means, and said electromagnetic means, whereby upon closing said hand switch and placing said body in a predetermined position said transducer means and said electromagnetic means are energized so that said pusher entrains said operable means for further rotational movement of the latter to expose another surface section in said body opening, said transducer means being a sound reproducing apparatus, said hollow body being made of elastic material facilitating adjustment of one of said body dimensions in relation to the quality of sound emanating from said sound reproducing apparatus.

2. The combination, in a display device for a doll, of transducer means, with displaceable mechanical means having display sections, electric circuit means including a power source, a body accommodating said transducer means, said mechanical means and said power source, said body being provided with a display opening for successively exhibiting said display sections, respective means in said electric circuit means for operating said transducer means independently of said mechanical means and in any position of said body and for actuating said mechanical means dependent on the operation of said transducer means and in a predetermined position of said body, said transducer means including sound reproducing means, and means constituted and arranged for dimensionally regulating the length of said body in relationship to the quality of sound emanating from said reproducing means.

3. The combination, in a doll's body having an opening, of electric voice reproducing means, with rotatably arranged eyeball means provided with display sections for exhibition in said opening of said body, electric circuit means including a power source housed in said body, first means includable in said electric circuit means for operating said voice reproducing means independently of said eyeball means and in any position of said body, and second means connectable with said circuit means for rotating said eyeball means to exhibit a selected display section in dependence on the operation of said voice reproducing means and in a predetermined position of said body, said voice reproducing means including a loudspeaker, said selected display section of said eyeball means being highly polished for image reflection of an observer, when looking thereat.

4. In a doll, the combination of a hollow body having walls made of elastic material, with at least one compartment defined by a partition within said body, means for regulating admission and escape of a fluid with respect to said compartment, whereby at least one predetermined dimension of said body may be subjected to change, and means for animating at least a part of said body and mounted on said partition without said compartment and within said body, said animating means being selectively variable to reflect said body dimension change.

5. A display device for use in connection with a doll comprising electric circuit means including a plurality of instrumentalities, a body supporting said instrumentalities, a member pivotally supported in an opening provided in said body and equipped with a plurality of sectional display parts, means including an extension connected with said member whereby the latter is automatically rotatable to exhibit one of said display parts upon placing said body in a predetermined position, said instrumentalities including electromagnetic means provided with a core carrying a pusher arranged in the path of movement of said extension, sound reproducing means for changing electrical into acoustical energy, a mercury switch, a hand-operated electric switch, said sound reproducing means being connectable with said circuit means through said electric switch in any position of said body, means mounting said mercury switch in said body, such that said mercury switch is closed when said body is in said predetermined position, said circuit means normally connecting said electromagnetic means and said mercury switch to energize the electromagnetic means upon closing of said mercury switch to cause engagement of said pusher with said extension and to cause said pivotally supported member to be further rotated to display another sectional part thereof, and means responsive to termination of the sound reproducing operation of said sound reproducing means for deenergizing said electromagnetic means to enable said pivotable member to exhibit said one display part, said other sectional display part being constructed to reflect the image of an observer when looking thereat during operation of said sound reproducing means.

6. A display device for use in connection with a doll comprising electric circuit means including a plurality of electric instrumentalities, a hollow body accommodating said instrumentalities, a member pivotally supported in said body, said member having an extension and being provided with a plurality of sectional display parts, weight means connected with said member so that the latter automatically exhibits one of said display parts upon placing said body in a predetermined position, said instrumentalities including an electrically operated pusher, which is arranged in the path of pivotal movement of said member extension, transducer means, a position sensitive switch, a hand-operated electric switch, said transducer means including a loudspeaker and being connected with said circuit means through said electric switch in any position of said body to thereby change electrical to acoustical energy, means mounting said sensitive switch in said body such that said sensitive switch is closed when the body is in said predetermined position, said circuit means normally connecting said electrically operated pusher and said sensitive switch to urge said pusher upon closing of said sensitive switch to cause engagement of said pusher with said member extension to thereby cause said pivotally supported member to be further pivotally moved to display another sectional part thereof, and means responsive to termination of the sound reproducing operation of said transducer means for deenergizing said electrically operated pusher to enable said member to exhibit said one display part, said other display part being provided with an image reflecting surface.

References Cited by the Examiner

UNITED STATES PATENTS

| | | | |
|---|---|---|---|
| 1,920,027 | 7/1933 | Wilhelm | 46—232 |
| 2,564,813 | 8/1951 | Moyers | 46—119 |
| 2,660,830 | 12/1953 | Jentzen | 46—247 |
| 2,669,063 | 2/1954 | Lang | 46—119 |
| 2,954,642 | 10/1960 | Jackson | 46—232 |
| 3,154,881 | 11/1964 | Elwell | 46—247 X |
| 3,159,942 | 12/1964 | Fiske | 46—117 X |

DELBERT B. LOWE, *Primary Examiner.*

ANTON O. OECHSLE, *Examiner.*

R. F. CUTTING, *Assistant Examiner.*